(No Model.)
F. CLARKE & H. H. BASSETT.
LATHE ATTACHMENT.
No. 397,694. Patented Feb. 12, 1889.
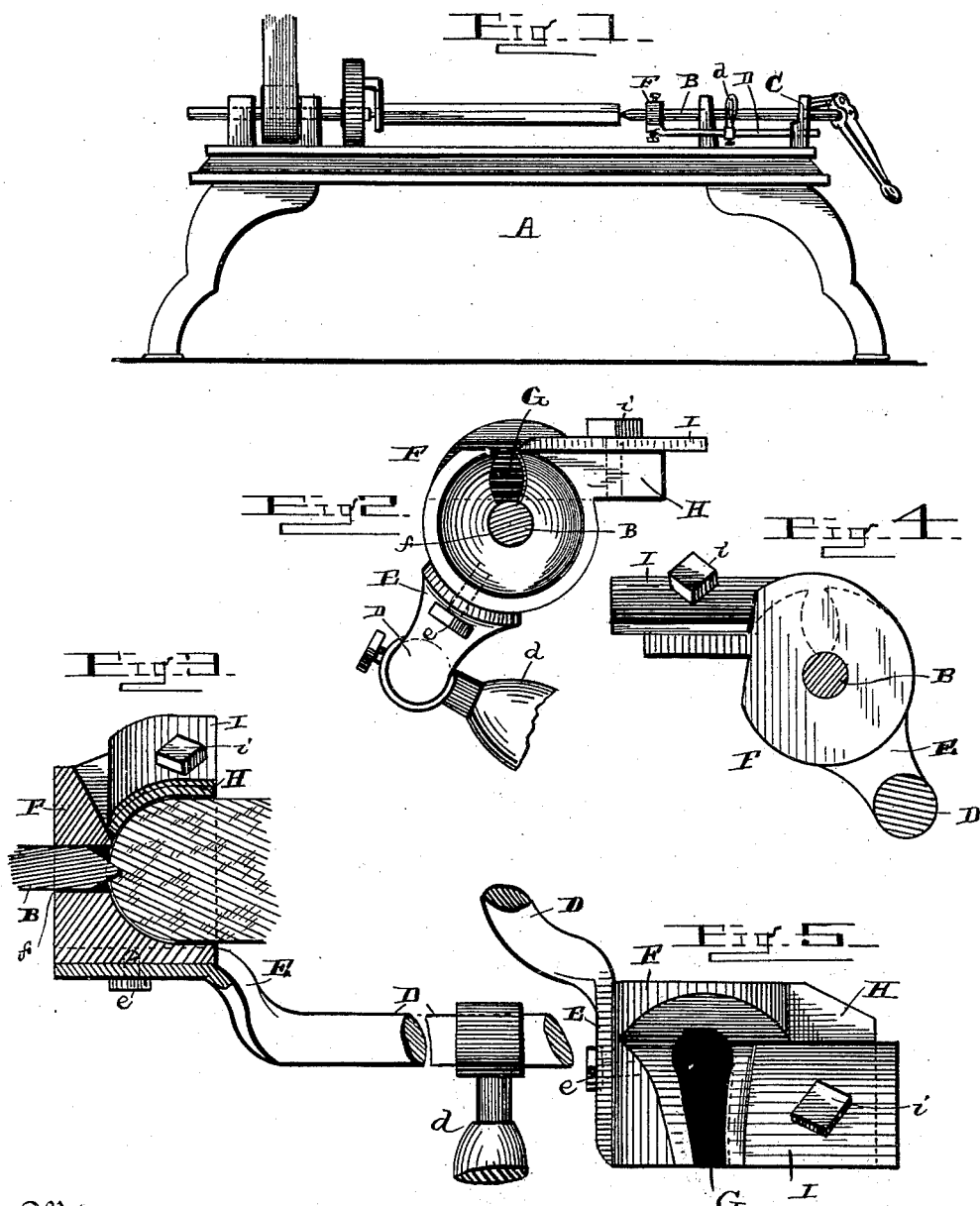
Witnesses
A. E. Sowell
B. W. Seville
Inventor,
H. H. Bassett and Fred Clarke
By their Attorney M. Alexander

UNITED STATES PATENT OFFICE.

FRED CLARKE AND HERBERT H. BASSETT, OF PIQUA, OHIO.

LATHE ATTACHMENT.

SPECIFICATION forming part of Letters Patent No. 397,694, dated February 12, 1889.

Application filed July 26, 1888. Serial No. 281,088. (No model.)

*To all whom it may concern:*

Be it known that we, FRED CLARKE and HERBERT H. BASSETT, of Piqua, in the county of Miami and State of Ohio, have invented certain new and useful Improvements in Lathe Attachments; and we do hereby declare that the following is a full, clear, and exact description thereof, reference being had to the accompanying drawings, and to the letters of reference marked thereon, which form part of this specification, in which—

Figure 1 is a side view of a lathe having our attachment applied. Fig. 2 is a face view of the attachment removed. Fig. 3 is a sectional view of the same. Figs. 4 and 5 are detail views thereof.

This invention relates to turning-lathes, and is a novel attachment for a gage-lathe or similar lathe employed to turn handles and such like articles, its object being to provide a device for finishing or rounding the ends of the handles or work held by the "fly-center" or "dead-center" spindle of the machine, so that the work can be completed without removing the blank from the lathe or readjusting it to suit the finishing-tool. The invention will be clearly understood from the following description and claims.

Reference being had to the accompanying drawings by letter, A designates an ordinary lathe having a work-dogging head at one end and a dead-center spindle, B, at the other end, between which the blank to be operated upon is mounted and rotated. Spindle B is journaled in a tail-block, C, and is longitudinally adjustable therein, as usual, by means of a hand-lever pivotally connected to its outer end.

D is a rod playing through an opening in block C and longitudinally movable therein. This rod extends parallel with spindle B, and is provided with a handle, $d$, by which it can be shifted. The front end of rod D is bent inward toward spindle B, and has its end E enlarged and concaved or angularly recessed to engage the periphery of a cutter-block, F, which is fixed to end E by a screw, $e$, passing through said end E and engaging a corresponding screw-threaded recess in cutter-block F, as shown. The shape of the engaging faces of end E and cutter F prevents any rocking movement of the cutter-block on said end.

The cutter-block has a central opening, $f$, corresponding in diameter to spindle B, on which the cutter-block is slipped and supported, the rod D serving to adjust and shift it on said spindle. The inner face of cutter-block F adjoining the wood blank mounted in the lathe is recessed, as shown; and G is a slot in the side thereof. H is a lug projecting laterally from cutter-block F at one side of slot G, and whose outer face is curved, as shown, corresponding to the sectional contour of the recess in the face of the cutter-block. I is a curved cutter-blade secured on lug H by a set-screw, $i$, its cutting-edge being adjusted over slot G in such position that when the cutter-block is moved forward by rod D it engages the end of the blank and reduces the end until a contour is imparted thereto corresponding to the recess in the face of the cutter-block, the edge of the cutter working in said slot and the chippings of the blank escaping therethrough.

From the foregoing it will be seen that when the blank is properly turned longitudinally, instead of removing it from the lathe and finishing up the end by hand or in another machine, we simply slide cutter-block F by rod D against the end of the blank without stopping the machine or interfering with the other cutters.

Cutter-blocks F of different sizes and forms can be employed, if desired, to impart different finishes to the ends of the blanks.

The attachment is readily applicable to nearly all ordinary makes of lathes. The rod D and its handle not only serve to advance the cutter-block on spindle B, but also prevent its rotation therewith.

It will be seen that practically the cutter is suspended on or carried by the spindle B, the rod D serving to prevent its rotation and to direct its movements.

Having described our invention, we claim—

1. The combination of the tail-block and dead-spindle of a lathe with a movable cutter-block supported on said spindle and adapted to be moved in contact with the end of the blank supported by said spindle, substantially in the manner and for the purpose described.

2. The combination of the tail-block and dead-center spindle of a lathe with a sliding cutter-block mounted on said spindle, the rod mounted on said tail-block and connected to said cutter-block, and its operating-handle, all substantially as described.

In testimony that we claim the foregoing as our own we affix our signatures in presence of two witnesses.

FRED CLARKE.
HERBERT H. BASSETT.

Witnesses:
H. C. GRAFFLIN,
GEORGE R. BASSETT.